March 22, 1955    A. A. SCARLETT ET AL    2,704,429
HARVESTING MACHINE HAVING CRUSHING ROLLS
Filed Aug. 18, 1951
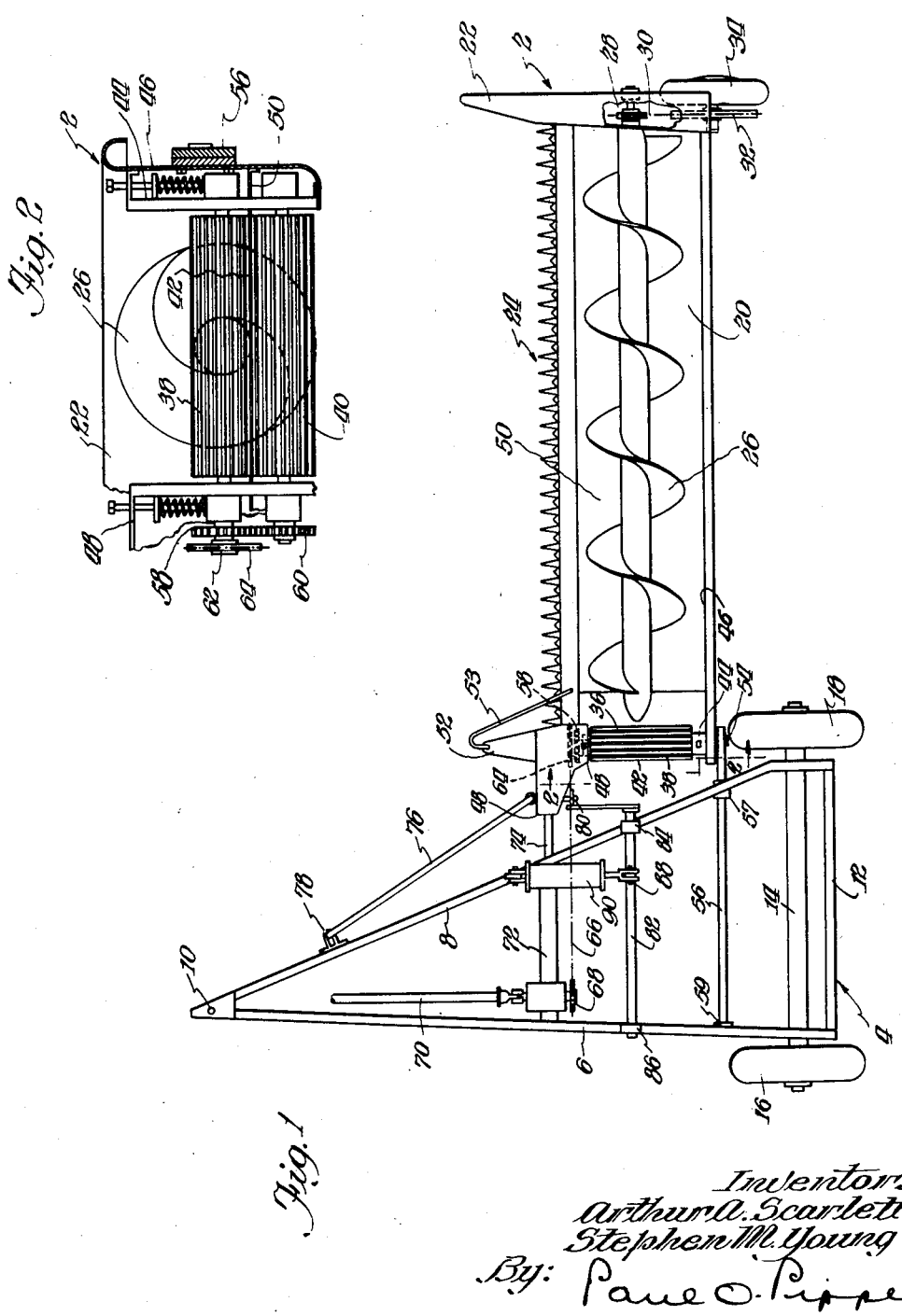
Inventors:
Arthur A. Scarlett
Stephen M. Young
By: Paul O. Pippel
Attorney

United States Patent Office 2,704,429
Patented Mar. 22, 1955

2,704,429

HARVESTING MACHINE HAVING CRUSHING ROLLS

Arthur A. Scarlett and Stephen M. Young, Hamilton, Ontario, Canada, assignors to International Harvester Company, a corporation of New Jersey Application August 18, 1951, Serial No. 242,451

1 Claim. (Cl. 56—1)

This invention relates to harvesting machines and more specifically to a machine and novel method of cutting, processing and windrowing a crop such as hay or the like.

A general object of the invention is to provide a novel apparatus to deposit the hay in loose windrows which promote aerification and are adapted to be picked by a relatively narrow pick-up.

A further object of the invention is to arrange the discharge of the harvesting unit on the stubbleward side of the machine in a position to form relatively narrow windrows intermediate and alongside closely spaced depressions or tracks made in the stubble by the wheels of the supporting structure whereby the crop is exposed to efficient aeration.

A different object of the invention is to provide a harvesting combination comprising a sickle at the forward end of the unit with a conveyor immediately therebehind, the conveyor moving the crop cut by the sickle laterally of the unit that is transversely of the line of draft thereof and in a manner to discharge the crop in large volume to a pair of crushing rolls located at the stubbleward side of the unit whereby the crushing rolls which are of relatively short width are prevented from disintegrating or chopping the crop into short lengths.

A further object is to provide a hay windrower wherein the cut hay is conveyed to the crushing device in such manner as to substantially prevent tangling of the separate plants and to feed the plants widthwise to the crushing device so that the entire extent or length of each thereof may pass substantially simultaneously through the device and be ejected forcibly and readily separate when discharged into a windrow.

A corollary object is to dispose the parts of the machine in such manner as to present the plants with the stems thereof generally parallel to the crushing rolls so as to crack each plant lengthwise and not chop it up into short lengths between the corrugations of the rolls. The long lengths of the plants facilitate baling and form a desirable lacework throughout the bale to hold the leaves and short pieces therein.

A still further object is to present the plants to the crushing rolls in such manner as to crack substantial lengths thereof.

A different object is to provide a narrow crushing device operating at substantial speed to forcibly discharge the plants and discharge them on the ground in a loose pile.

Another object is to provide a novel method of treating the plants to obtain the advantages heretofore enumerated.

These and other objects will become more apparent from the specification and drawings, wherein:

Figure 1 is a top plan view of the invention and,

Figure 2 is an enlarged sectional view taken substantially on the line 2—2 of Figure 1.

Describing the invention in detail, the harvesting unit generally designated 2 is shown in connection with a trail-behind wheeled framework generally designated 4, said framework comprising forwardly converging side members 6 and 8 interconnected at their forward extremities to provide the hitch point 10 and at their rear extremities by a cross member 12. The framework members 6 and 8 afford a journal connection adjacent to their rear ends for an axle structure 14 which supports wheels 16 and 18 at opposite ends outwardly of the framework.

The harvesting unit comprises an ambulant or mobile trough-like structure 20 extending laterally outwardly from the grainward side of the framework 4, said structure 20 comprising a divider 22 at its outboard end closing the outboard end of the trough. The forward edge of the trough structure carries a cutter bar assembly 24 and within the trough immediately back of the cutter bar assembly is disposed an open end auger 26 which extends generally parallel to the cutter bar assembly and is substantially coextensive therewith longitudinally. The auger 26 is rotatably supported at its outboard end from the paneling of the divider and is provided with a sprocket 28 constrained for rotation therewith, the sprocket being driven by a chain 30 which is trained about a sprocket 32 driven by a ground engaging gauge wheel 34 suitably journaled to the paneling of the divider.

The inboard extremity of the trough is preferably inclined upwardly and terminates at the intake area 36 defined between a pair of top and bottom opposed crusher rolls 38 and 40 which are rotatable on axes generally parallel to the line of draft of the unit. It will be noted that the discharge zone 42 between the rolls is disposed slightly inboardly of the inner side of the wheel 18 on the grainward side of the supporting framework 4. It will thus be seen that the crop discharging from the crushing rolls will be deposited on the stubble immediately alongside a track developed by the wheel 18 bending the stubble whereby the crushed crops are exposed to efficient aeration to accelerate curing.

The top and bottom rolls are suitably journaled at the rear extremities of their shafts from a bracket 44 mounted to the upturned rear section 46 of the trough as by welding and the forward ends of the roller shafts from a bracket 48 suitably secured to the bottom section 50 of the trough paneling and to a ground-engaging runner 52 which is disposed beneath the trough and suitaby connected thereto. The runner 52 may be provided with a guide or deflecting rod 53. The inboard end of the unit may be connected pivotally as at 54 to a cross brace 56 journaled on a transverse axis at 57 and 59 to the framework 4, the connection at 54 taking place with the rear paneling section 46 of the trough on an axis extending generally parallel to the line of draft of the unit. The brace 56 also serves as a leveler to prevent uneven bunching of the windrows.

The forward end of the shafts of the crusher rolls may be provided with intermeshing gears 58 and 60 constrained for rotation therewith and the shaft 62 of the upper roll may be provided with a sprocket 64 which may be driven by a chain 66 trained about a sprocket 68 connected to a power take-off drive 70 supported by the framework 4 from a cross member 72 thereof. The drive 70 may include a suitable gearing assembly for driving a pitman 74 operatively connected to the inboard end of the sickle bar 24. The bracket structure 48 may be connected to the rear end of a tension brace rod 76, the forward end of which may be hooked forwardly of the unit 2 and connected at 78 to the side member 8 of the framework 4.

The bracket structure 48 may have a clevis connection 80 to one end of a crank assembly 82 suitably journaled on the support structure 4 through eyes 84 and 86 on the side members 6 and 8 thereof. The other end of the crank assembly may be pivotally connected as at 88 to one end of a hydraulic motor 90, the other end of which may be anchored pivotally from the framework 4 on the member 8. It will be appreciated that actuation of the hydraulic motor will raise and lower the forward portion of the unit about the axis of wheel 34 and brace 56 coaxial therewith to determine its attack attitude with respect to the crop.

What is claimed is:

In a hay harvesting machine, an ambulant structure comprising a cutter bar at its forward end extending transversely to the direction of travel of the machine, a trough therebehind disposed in receiving relationship thereto, an auger within the trough extending along the backside of the cutter bar for substantially the full length thereof longitudinally of the trough and supported at the grainward end of the structure and open at the stubbleward side of the trough, a pair of opposed crushing rollers supported from the structure and disposed angularly with respect to the axis of the auger at the stubbleward end of the trough in receiving relationship to the open end of the auger and discharging angularly to the line of draft of the machine on the stubbleward side thereof.

References Cited in the file of this patent

UNITED STATES PATENTS

| | | |
|---|---|---|
| 1,823,387 | Campbell | Sept. 15, 1931 |
| 1,958,910 | Christiansen | May 15, 1934 |
| 1,960,596 | Rimple | May 29, 1934 |
| 2,501,424 | Ufer | Mar. 21, 1950 |
| 2,503,416 | Russell | Apr. 11, 1950 |
| 2,519,304 | Whitley | Aug. 15, 1950 |
| 2,521,999 | Scott | Sept. 12, 1950 |
| 2,593,617 | Schroeppel | Apr. 22, 1952 |
| 2,664,684 | Russell | Jan. 5, 1954 |